United States Patent [19]
Reimers et al.

[11] Patent Number: 5,934,616
[45] Date of Patent: Aug. 10, 1999

[54] AIRCRAFT PRESSURE BULKHEAD

[75] Inventors: Hans-Detlef Reimers, Buxtehude; Michael Hauschildt, Jork, both of Germany

[73] Assignee: DaimlerChrysler Aerospace Airbus GmbH, Hamburg, Germany

[21] Appl. No.: 08/989,505

[22] Filed: Dec. 12, 1997

[30] Foreign Application Priority Data

Dec. 14, 1996 [DE] Germany ................... 196 52 172

[51] Int. Cl.⁶ ..................................................... B64C 1/10
[52] U.S. Cl. ......................................................... 244/119
[58] Field of Search ............................... 244/117 R, 119, 244/131, 133, 121; 220/581, 584, 608, 609, 592

[56] References Cited

U.S. PATENT DOCUMENTS

| | | | |
|---|---|---|---|
| 1,577,974 | 3/1926 | Kelley | 220/581 |
| 1,897,163 | 2/1933 | Thomas | 220/581 |
| 2,162,227 | 6/1939 | Page | 244/119 |
| 3,132,618 | 5/1964 | Andrews et al. | 220/581 |
| 4,023,700 | 5/1977 | Buquet et al. | 220/592 |
| 4,313,545 | 2/1982 | Maeda | 220/581 |
| 5,062,589 | 11/1991 | Roth et al. | 244/119 |

FOREIGN PATENT DOCUMENTS

| | | |
|---|---|---|
| 3844080 | 7/1990 | Germany . |
| 3906170 | 8/1990 | Germany . |

*Primary Examiner*—Galen L. Barefoot
*Attorney, Agent, or Firm*—W. F. Fasse; W. G. Fasse

[57] ABSTRACT

A pressure bulkhead especially for closing the tail end of the pressurized interior of an aircraft fuselage includes a curved or cupped disk, a peripheral rim, and a transition portion joining the rim to the disk. All the components of the bulkhead are integrally formed of a fiber-reinforced composite material. The peripheral rim and the transition portion together form a circumferential frame that supports circumferential forces and transfers forces into the aircraft fuselage, to which the rim is connected. The transition portion has a curved cross-section that curves in the opposite direction relative to the curvature of the cupped disk, whereby the rim bends or flares back toward the convex side of the cupped disk. The curvature of the transition portion is relatively tight so that an acute angle is formed between the rim and the cupped disk, and the rim extends in contact with the inner surface of the fuselage structure over a contact range at which the rim may be rivet-connected to the fuselage. A reinforcing ring may be arranged between the rim and the fuselage.

20 Claims, 1 Drawing Sheet

AIRCRAFT PRESSURE BULKHEAD

FIELD OF THE INVENTION

The invention relates to a pressure bulkhead for an aircraft having a pressurized cabin, and especially a semi-spherical cup-shaped bulkhead for enclosing the tail end of a pressurized aircraft cabin.

BACKGROUND INFORMATION

It is generally known to provide a pressure bulkhead for enclosing, in a pressure-tight manner, the tail end of the pressurized interior of an aircraft fuselage. The pressure bulkhead includes all structural components that are necessary for achieving an airtight and pressure-tight seal of the pressurized interior of the fuselage, and for taking up and further transmitting into the fuselage structure all of the forces that result from the pressure difference on the two opposite sides of the bulkhead. Generally, two types of bulkhead structures are known in the art. Pressure bulkheads of the first type are embodied as curved, stiffened membrane structures, for example in the form of a semi-spherical cup. Pressure bulkheads of the second type are embodied as a planar, skinned-over grid frame structures.

The choice between these two types of pressure bulkheads is based on the respective prevailing boundary conditions, and especially, for example, the available space, the size of the cross-sectional area that is to be enclosed, and the like. Since the curved form of the first type of pressure bulkhead is advantageous for supporting, transferring and counteracting the arising forces, this type of pressure bulkhead can have a lighter weight and simpler construction. Namely, a membrane structure that is subjected to a pressure supports the resulting loads in directions along its curved surface only in the form of meridian forces and circumferential forces. The circumferential forces are all internal forces within the pressure bulkhead. On the other hand, the meridian forces must be taken up and supported by the surrounding structures of the aircraft fuselage around the edge of the membrane structure. Moreover, the meridian forces of the membrane structure have an outwardly directed force component around the edge of the membrane at the area of the transition or junction with the aircraft fuselage.

A ring frame or circumferential support frame may be provided for taking up such outwardly directed force components, whereby the ring frame is stressed in its circumferential direction due to the forces resulting from the applied pressure. The ring frame simultaneously serves the purpose of compensating for or bridging between the membrane structure and the cross-section of the fuselage, which under some circumstances may deviate from a circular cross-section. Generally, known ring frames embodied as a metal structure have a modified "I" cross-sectional shape. As a result, the ring frame is a significant component, with respect to its weight and the cost and complexity of manufacturing it. For example, the ring frame typically accounts for approximately 40% of the weight of the entire pressure bulkhead, while the membrane structure itself only accounts for approximately 32% of the weight of the total typical pressure bulkhead.

The conventional manufacturing methods for assembling the pressure bulkhead out of a plurality of segment-shaped milled parts made of aluminum or even of titanium are quite complicated and costly. Moreover, the separate steps typically required for manufacturing the pressure bulkhead out of sheet metal components require that the ring frame is riveted to the membrane structure in an additional work step.

The presently known embodiments of pressure bulkheads in the form of curved membrane structures all suffer the problem of an inadequately durable or fatigue resistant connection of the membrane structure to the fuselage structure, as well as the problem of an inadequate corrosion resistance characteristic. The existing or prevailing stiffness transition between the original undisturbed fuselage structure and the structure of the pressure bulkhead is critical with respect to achieving an adequate fatigue strength when the fuselage is subjected to a cyclical interior pressure load. The corrosion characteristics are similarly critical in typical known pressure bulkhead structures. Namely, corrosion inducing substances typically accumulate in the lower region of the relevant cross-sectional area, and these substances regularly lead to corrosion damage of the fuselage shell structure and of the pressure bulkhead itself, even if drainage holes or the like are provided. It is a further difficulty that the respective affected areas of the structures are typically very difficult to access for inspection or maintenance purposes.

German Patent Laying-Open Document 3,844,080 discloses a pressure bulkhead for enclosing and sealing, in a pressure-tight manner, an axial end of an internal pressurized space within the fuselage of a commercial transport aircraft. The forces resulting from the internal pressure in the aircraft are taken up by the bulkhead and transferred into the fuselage structure. The bulkhead has a two part construction, including a network of tension elements such as cables, chains, belts or straps, metal ribs, metal sheet stampings or cut-outs, or the like, for taking up the pressure forces, and a flexible membrane supported by the network for providing the pressure seal. The tension elements of the support network are arranged in meridian and circular directions. The tension elements, such as cables, are connected by cable lugs or the like to the fuselage structure, so that the forces resulting in the support network are transferred in the form of tension or pressure forces into the fuselage. Furthermore, a stiff ring may be provided near the outer perimeter of the main supporting network, while additional cables or the like connect the stiff ring to the fuselage. This publication does not provide any suggestions for improving the fatigue strength of the pressure bulkhead and its connection to the aircraft fuselage.

German Patent Laying-Open Document 3,906,170 discloses a pressure bulkhead for sealing and enclosing the pressurized interior of an aircraft. The disclosed pressure bulkhead comprises a concave curved cup-shaped member of fiber reinforced composite material, which may be a monolithic material of woven or knitted or unidirectional fibers embedded in a resin material, and may include a thicker region of carbon fibers around the rim of the bulkhead. The rim of the bulkhead is connected to the fuselage, for example by rivets. The bulkhead has a shape that is always concave facing the pressurized interior of the aircraft. Namely, the bulkhead, including the cupped or curved member and the rim, has a curvature without any inflection point.

SUMMARY OF THE INVENTION

In view of the above it is an object of the invention to provide a pressure bulkhead that achieves substantially improved characteristics as compared to the prior art, with respect to fatigue strength and durability, corrosion resistance, ease of inspection and maintenance, simplicity of construction, low cost, and low weight. Further objects of the invention are to overcome or avoid the disadvantages of the prior art, and to achieve additional advantages, as apparent from the present description.

The above objects have been achieved in a pressure bulkhead especially for closing and sealing the tail end of the pressurized interior of an aircraft fuselage according to the invention. The present pressure bulkhead essentially includes a curved or cupped disk, a peripheral rim or edge portion around the periphery of the disk, and a transition zone or portion connecting or joining the disk with the rim. The rim and the transition portion together form a ring frame or circumferential support frame by which the pressure bulkhead is connected to and transmits forces to the fuselage structure. The transition portion has a curved cross-sectional shape that curves in a direction opposite that of the curvature of the cupped disk.

More particularly, the rim has a substantially cylindrical shape or a conical frustum shaped configuration extending back away from the concave side of the cupped disk of the bulkhead toward the convex side of the cupped disk of the bulkhead. The transition portion has a relatively tight radius of curvature which is smaller than the radius of curvature of the cupped disk of the bulkhead and which curves in the opposite direction thereto. Namely, for example, the concave side of the major cupped disk of the bulkhead faces the pressurized interior of the aircraft fuselage, while the convex side of the transition zone faces the pressurized interior and joins the concave side of the cupped disk. An acute angle is formed between the rim and the cupped disk of the bulkhead, whereby this acute angle spans the concave side of the transition zone. As a result, the ring frame or circumferential support frame has a U-shape or J-shaped cross-section, and a radially outer surface of the ring frame contacts the fuselage, or a reinforcing ring mounted thereon, over an axially extending range.

The entire bulkhead structure is preferably formed as an integral or unitary member of fiber reinforced composite material, which may either have a common uniform fiber orientation throughout all portions of the bulkhead or may have different fiber orientations in the cupped disk, the transition zone, and/or the rim, in order to achieve improved strength characteristics. The ring frame is preferably connected to the fuselage by rivets. A reinforcing ring may be arranged between the rim and the fuselage.

The bulkhead construction according to the invention particularly achieves the advantages of reducing the effort and cost of construction and installation, avoiding the danger of corrosion, and considerably improving the fatigue strength and durability.

BRIEF DESCRIPTION OF THE DRAWINGS

In order that the invention may be clearly understood, it will now be described in connection with example embodiments of the invention, with reference to the drawings, wherein.

DETAILED DESCRIPTION OF PREFERRED EXAMPLE EMBODIMENTS AND OF THE BEST MODE OF THE INVENTION

Figure 1:
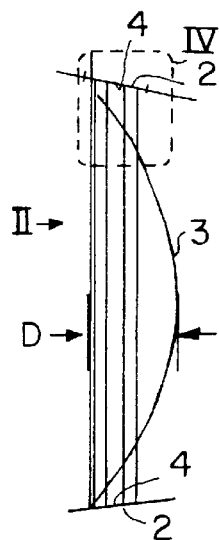
FIG. 1 is a schematic side sectional view of a pressure bulkhead according to the invention.

FIG. 1 is a schematic sectional view of a pressure bulkhead 1 arranged near the tail end of a fuselage structure 2, whereby both the pressure bulkhead 1 and the fuselage structure 2 are uniformly rotationally symmetrical, and whereby the section is taken along an axial plane of the fuselage. The pressure bulkhead 1 includes a curved or cupped disk 3 generally in the form of a self-supporting membrane serving as the element that seals the axial end of the pressurized interior of the fuselage and takes up the pressure induced forces, a peripheral rim 4, and a transition portion 5 that integrally connects the rim 4 with the cupped disk 3. The rim 4 together with the transition portion 5 forms a ring frame or circumferential support frame 4' having a U-shaped or J-shaped cross-section.

Both the cupped disk 3 and the rim 4 are preferably manufactured of a fiber-reinforced composite material, which may be any known composite material having suitable characteristics. In this manner, the entire pressure bulkhead 1 may easily be manufactured in a unitary or integral manner, with the cupped disk 3, the transition portion 5, and the rim 4 all formed together as one piece, preferably from the same type of fiber reinforced composite material. For example, the composite material may be laid up in several layers or sprayed onto an appropriate mold or forming surface. Due to the one piece construction, the previously typical construction of the ring frame as a separate structural component can be avoided. It thereby also becomes possible to embody the cupped disk 3 and the integrally connected ring frame 4' in such a manner that the forces arising in the cupped disk 3 as a result of the internal pressure within the fuselage are transmitted into the ring frame 4' and are largely taken up within the ring frame 4' with only a portion of the total loads being transmitted into the fuselage structure 2.

Figure 2:
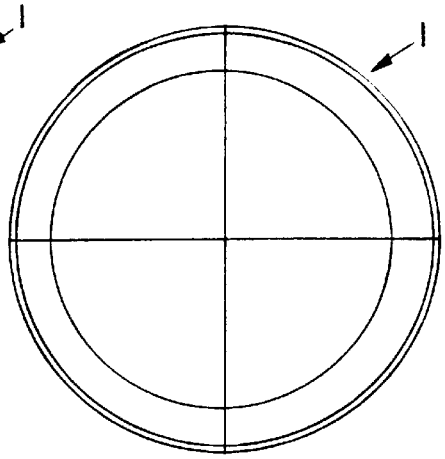
FIG. 2 is a schematic end view of the pressure bulkhead in the direction of view II in FIG. 1.
Figure 3:
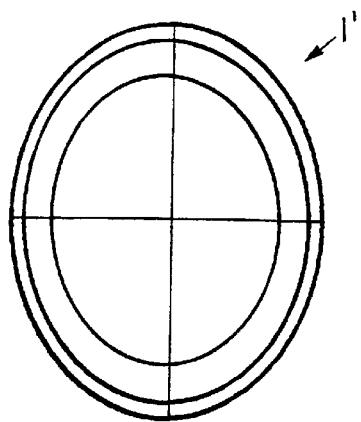
FIG. 3 is a view similar to that of FIG. 2, but showing a pressure bulkhead having a non-circular shape according to an alternative embodiment of the invention.

FIG. 2 shows an axially directed or end view II of the pressure bulkhead 1 of FIG. 1, whereby the circular shape of the pressure bulkhead 1 is apparent. In such a relatively simple case, the pressure bulkhead 1 can be embodied as a rotationally symmetrical and uniform body. In contrast, FIG. 3 shows an alternative shape of a pressure bulkhead 1' which is non-circular, but rather oval or elliptical. Such a shape is necessary if the cross-section of the fuselage structure 2 has such as shape, which is quite common. This is not a problem, however, because the present pressure bulkhead may be configured in any shape necessary using fiber-reinforced composite materials. Also, the curvature of the cupped disk 3 may be semi-spherical or non-spherical.

Figures 4, 5:
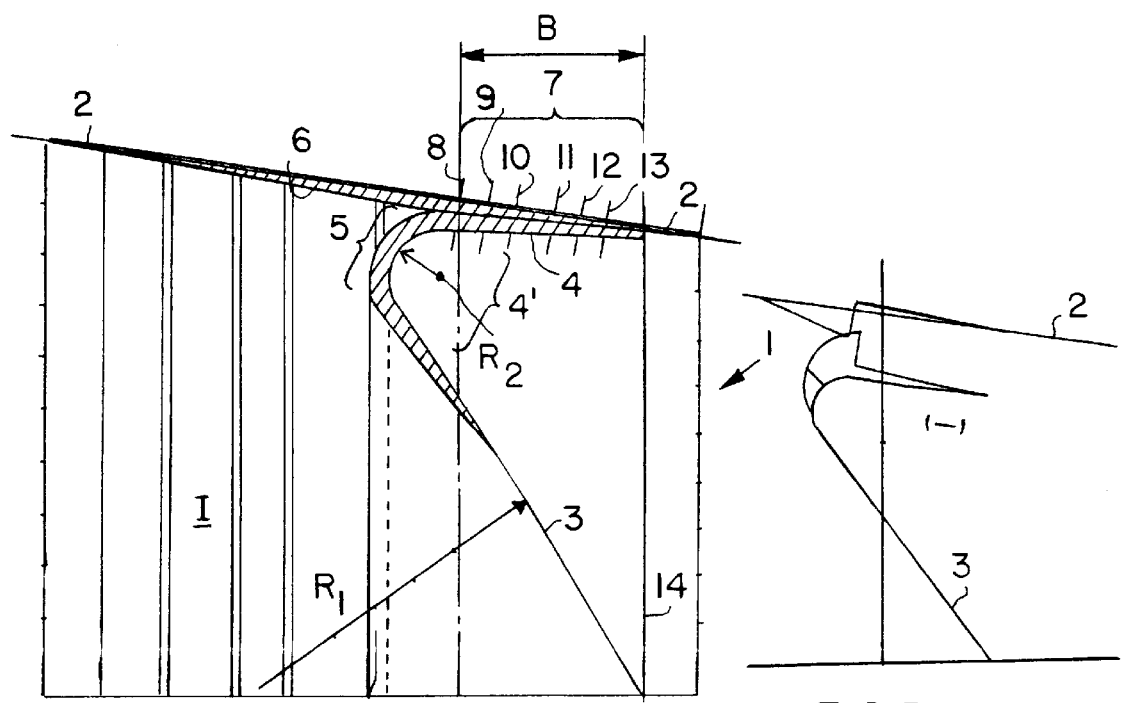
FIG. 4 is an enlarged partial sectional detail view of the detail area IV shown in FIG. 1.
FIG. 5 is a schematic representation of the bending moments leading to unidirectional stressors effective over the transition zone and rim of a pressure bulkhead according to the invention.

FIG. 4 shows an enlarged detail sectional view of the radially outer portion of the pressure bulkhead 1 and its connection to the fuselage structure 2. The specific configurations of the rim 4 and the transition portion 5 forming the ring frame 4', as well as the cupped disk 3, are shown in this figure. Namely, the transition portion 5 has a radius of curvature $R_2$ that is relatively small, i.e. the transition portion 5 has a tight curvature, in comparison to the radius of curvature $R_1$ of the cupped disk 3. Furthermore, the curvature of the cupped disk 3 is opposite that of the transition portion 5, so that the concave side of the cupped disk 3 faces the pressurized interior I of the fuselage 2 while the convex side of the transition portion 5 faces the pressurized interior I. As a result, the ring frame 4', or specifically the rim 4, is flared or bent back away from the concave side of the cupped disk 3 and toward the convex side thereof, such that the peripheral edge 14 of the rim 4 is on the non-pressurized exterior or convex side of the pressure bulkhead 1 and faces toward the tail of the aircraft. An acute angle is formed between the rim 4 and the cupped disk 3 of the bulkhead 1, spanning the concave side of the transition portion 5 on the non-pressurized side of the bulkhead 1.

The rim 4 and the transition portion 5, as well as an outer peripheral portion of the cupped disk 3, together form the ring frame 4', which has a substantially V, J or U-shaped cross-section and which is a unitary or integral part with the cupped disk 3 forming the pressure bulkhead 1. The cupped disk 3 has a thickness that is adequate for providing the necessary strength to take up the arising circumferential and meridian forces, for example as described below with reference to FIG. 5. In order to take up and support the circumferential and meridian forces conveyed from the cupped disk 3 into the ring frame 4', the ring frame 4' simply has a substantially greater wall thickness than that of the cupped disk 3, whereby the wall thickness varies over the ring frame 4' in accordance with the forces that must be taken up as schematically shown in FIG. 4 and further described with reference to FIG. 5 below.

In the present pressure bulkhead 1, therefore, the forces acting on and arising in the curved or cupped disk 3 due to the interior pressure in the fuselage are transmitted through the unitary or integral ring frame 4' into the fuselage structure 2 as bending stresses. In order to achieve this, the rim 4 has a substantially cylindrical or conical configuration that flares back toward the tail end of the aircraft and is in contact with the fuselage over a circumferential contact range having the axial dimension B. Herein, the "substantially cylindrical" outer contour of the rim 4 is intended to encompass a circular cylindrical shape, an oval or other non-circular cylindrical shape, a conical frustum shape, and a barrel shape. Preferably, the contact range B is a substantial portion of the total axial depth D of the curved or cupped disk 3 (see FIG. 1). This further simplifies the construction and installation, and improves the force transfer between the bulkhead 1 and the fuselage structure 2, as well as the overall fatigue strength.

In order to provide further strength for supporting the bending stresses in the fuselage structure 2, the fuselage structure 2 may be reinforced in the contact area of the ring frame 4' by means of a circumferential reinforcing ring 6 made of fiber-reinforced composite material or metal. The reinforcing ring 6 is arranged at least partially between the rim 4 of the bulkhead 1 and the fuselage structure 2, and further has a sectional shape that compensates for any differences or deviations between the outer shape of the rim 4 and the inner shape of the fuselage structure 2 over the contact range 3. A rivet connection 7 serves to positively transfer the forces from the ring frame 4' into the reinforcing ring 6 and the fuselage structure 2, i.e. several rows of rivets 8 to 13 connect the rim 4 of the bulkhead 1 to the reinforcing ring 6 and the fuselage structure 2 over the contact region 3. Advantageously, the rivets 8 to 13 are all on the non-pressurized side of the bulkhead 1, so that there is no particular concern regarding sealing the rivets in a pressure-tight manner. Furthermore, the present configuration of the rim 4 bent back with an opposite curvature relative to the curved disk 3 of the bulkhead 1 achieves a wedging or seating effect of the rim 4 against the fuselage structure 2 over the contact range 8 due to the forces caused by the pressure in the interior I of the fuselage and the resultant bending stresses transmitted through the curved transition portion 5.

The use of fiber-reinforced composite materials, and especially composites based on carbon fibers, is very advantageous in comparison to the use of aluminum bulkhead components, because the composite components have a relatively high fatigue strength and durability as well as a considerably reduced structural weight for achieving the same strength. As a further advantage, the present pressure bulkhead can completely avoid or omit all metal components, and any separate strengthening components, i.e. the pressure bulkhead can completely consist of a unitary component of fiber reinforced composite material, which is connected to the fuselage by a reinforcing ring and rivets.

Moreover, the fiber orientation of the composite material may be configured as needed to achieve different embodiments of the invention having different characteristics. For example, in one embodiment, all of the components or portions of the bulkhead 1 have a balanced or substantially balanced fiber orientation. Such an omnidirectional fiber orientation results in an isotropic or substantially isotropic strength and stiffness characteristic throughout the bulkhead, and is generally easy to manufacture. In a second possible embodiment, the different portions of the bulkhead may have unbalanced fiber orientations. For example, the curved or cupped disk 3 may predominantly have a radial or meridian fiber orientation, while the transition portion 5 and the rim 4 may predominantly have a circumferential fiber orientation with through-going meridian fibers as well. In this manner, the particular strength characteristics, which correspond to the number of layers, the position, and the orientation or direction of the fibers, may be matched to the locally prevailing requirements in each portion or component of the bulkhead 1.

It may also be advantageous to select the fiber orientation predominantly in view of production requirements rather than in view of static strength requirements. In this manner, the resulting pressure bulkhead might not have the lowest possible weight that would be achieved by the statically optimum solution, but would have a lower cost and effort involved in the production. From this viewpoint, the pressure bulkhead may generally have a non-uniform fiber orientation in view of the particular production demands. The fiber orientation may also for example be a random fiber orientation as for example produced by a spray-lay-up method.

FIG. 5 is a diagram that schematically represents the bendings moment leading to unidirectional stressors applied locally over the area of the connection between the pressure bulkhead 1 and the fuselage 2 when an increased pressure exists in the interior I of the fuselage. Although the static evaluation of the pressure bulkhead in this context is actually a three-dimensional problem, the simplified sectional view of FIG. 4 is only a two-dimensional representation, whereby the circumferentially directed forces have not been shown. Within the curved or cupped disk 3 of the bulkhead, only tension forces exist, directed along the local surface direction of the disk 3. These tension forces act upon the ring frame 4' around the perimeter of the disk 3 through the transition portion 5. As a result, a bending moment arises in the transition portion 5 and increases to the maximum value $Mb_{R1}$ at the location of the first row of rivets 8 of the river connection 7. The bending moment in turn is transmitted into the reinforcing ring 6 and the fuselage structure 2 through the rivet connection 7. As a result, the moment within the ring frame 4' drops to the substantially lower value $Mb_{R2}$ at the location of the first row of rivets 8, and then slopes off to zero over the contact range B, i.e. over the range of the rivet connection 7 up to the edge 14 of the rim 4. A bending moment is also transmitted into the reinforcing ring 6 through the rivet connection 7, whereby bending stresses also arise and are taken up within the reinforcing ring 6.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In an aircraft having a fuselage, a pressurizable interior space within said fuselage, and a pressure bulkhead arranged in said fuselage to bound said pressurizable interior space on one side of said bulkhead, an improvement wherein said pressure bulkhead comprises a cupped disk having a first curvature, a peripheral rim, and a transition portion connecting said peripheral rim with said cupped disk, wherein said transition portion and said peripheral rim together form a circumferential support frame of said pressure bulkhead, said peripheral rim bears against and is connected to said fuselage over a circumferential band contact range, said transition portion has a curved cross-sectional shape with a second curvature that curves in a direction opposite that of said first curvature of said cupped disk, an acute angle spanning said transition portion is formed between said peripheral rim and said cupped disk, and at least said circumferential support frame comprises a fiber-reinforced composite material.

2. The improved pressure bulkhead in the aircraft according to claim 1, wherein said first curvature of said cupped disk is concave toward said pressurizable interior space, and said second curvature of said transition portion is convex toward said pressurizable interior space.

3. The improved pressure bulkhead in the aircraft according to claim 1, wherein said pressure bulkhead is arranged in a tail portion of said aircraft, and said peripheral rim extends from said transition portion back toward a tail of said aircraft along said fuselage to a free peripheral edge of said rim that is directed toward said tail of said aircraft.

4. The improved pressure bulkhead in the aircraft according to claim 1, wherein said pressure bulkhead is a unitary one-piece component integrally including said cupped disk, said transition portion and said peripheral rim.

5. The improved pressure bulkhead in the aircraft according to claim 1, wherein said circumferential support frame has a J-shaped cross-section formed by said transition portion and said peripheral rim.

6. The improved pressure bulkhead in the aircraft according to claim 1, wherein said circumferential band contact range extends over a substantial axial dimension of the maximum axial depth dimension of said pressure bulkhead.

7. The improved pressure bulkhead in the aircraft according to claim 1, further comprising plural circumferential rows of rivets connecting said peripheral rim to said fuselage over said circumferential and contact range, on a side of said cupped disk opposite said pressurizable interior space.

8. The improved pressure bulkhead in the aircraft according to claim 1, further comprising a reinforcing ring separate from said circumferential support frame and arranged at least partially between said peripheral rim and said fuselage, and further comprising rivets mutually interconnecting said peripheral rim, said reinforcing ring and said fuselage.

9. The improved pressure bulkhead in the aircraft according to claim 8, wherein said reinforcing ring consists essentially of a fiber-reinforced composite material or metal, and has a shape that compensates for any shape difference between said peripheral rim and said fuselage.

10. The improved pressure bulkhead in the aircraft according to claim 1, wherein said pressure bulkhead has a circular plan shape.

11. The improved pressure bulkhead in the aircraft according to claim 1, wherein said pressure bulkhead has a non-circular plan shape.

12. The improved pressure bulkhead in the aircraft according to claim 4, wherein said circumferential support frame has a greater wall thickness than does said cupped disk.

13. The improved pressure bulkhead in the aircraft according to claim 4, wherein said pressure bulkhead essentially consists of said fiber-reinforced composite material.

14. The improved pressure bulkhead in the aircraft according to claim 13, wherein said fiber-reinforced composite material comprises carbon fibers throughout said cupped disk, said transition portion and said peripheral rim.

15. The improved pressure bulkhead in the aircraft according to claim 13, wherein said fiber-reinforced composite material comprises fibers that have a substantially balanced fiber orientation which leads to isotropic material behavior throughout said pressure bulkhead.

16. The improved pressure bulkhead in the aircraft according to claim 13, wherein said fiber-reinforced composite material comprises fibers that have an unbalanced fiber orientation that leads to anisotropic material behavior in at least one of said peripheral rim, said transition portion and said cupped disk relative to a remainder of said pressure bulkhead.

17. The improved pressure bulkhead in the aircraft according to claim 16, wherein said fiber-reinforced composite material of said cupped disk has fibers with predominant fiber orientation along meridian lines, and said fiber-reinforced composite material of said circumferential support frame has first fibers with a circumferential orientation and second fibers with a substantially radial or a substantially axial orientation.

18. The improved pressure bulkhead in the aircraft according to claim 12, wherein said wall thickness of said circumferential support frame varies along said transition portion between said cupped disk and said peripheral rim.

19. A pressure bulkhead for axially bounding a pressurizable interior space within a fuselage of an aircraft, said pressure bulkhead comprising a cupped disk that has a concave side and a convex side, a peripheral rim that extends substantially cylindrically or conically, and a transition portion that joins said peripheral rim with said cupped disk and that has a convex curvature toward said concave side of said cupped disk and a concave curvature toward said convex side of said cupped disk, wherein an acute angle spanning said concave curvature of said transition portion is formed between said peripheral rim and said convex side of said cupped disk.

20. The pressure bulkhead according to claim 19, wherein said pressure bulkhead is a unitary one-piece component integrally including said cupped disk, said transition portion and said peripheral rim, and essentially consists of at least one fiber-reinforced composite material.

* * * * *

UNITED STATES PATENT AND TRADEMARK OFFICE
CERTIFICATE OF CORRECTION

PATENT NO. : 5,934,616

DATED : August 10, 1999

INVENTOR(S) : Reimers et al.

It is certified that error appears in the above-identified patent and that said Letters Patent is hereby corrected as shown below:

Col. 3, line 65, after "to", replace "unidirectional stressors" by --meridional stresses--;

Col. 5, line 50, after "range", replace "3." by --B.--;
      line 54, after "region", replace "3." by --B.--;
      line 62, after "range", replace "8" by --B--.

Col. 6, line 42, after "to", replace "unidirectional stressors" by --meridional stresses--.

Col. 7, line 53, after "circumferential", replace "and" by --band--.

Signed and Sealed this

Eighth Day of February, 2000

*Attest:*

Q. TODD DICKINSON

*Attesting Officer*     *Commissioner of Patents and Trademarks*